(12) United States Patent
Viola et al.

(10) Patent No.: US 7,251,644 B2
(45) Date of Patent: Jul. 31, 2007

(54) PROCESSING AN ELECTRONIC DOCUMENT FOR INFORMATION EXTRACTION

(75) Inventors: Paul Viola, Kirkland, WA (US); Hiu Chung Law, East Lansing, MI (US); James Rinker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 10/909,534

(22) Filed: Aug. 2, 2004

(65) Prior Publication Data

US 2005/0125746 A1 Jun. 9, 2005

Related U.S. Application Data

(63) Continuation of application No. 10/835,215, filed on Apr. 29, 2004.

(60) Provisional application No. 60/527,219, filed on Dec. 4, 2003.

(51) Int. Cl.
  *G06F 17/30* (2006.01)
  *G06F 7/00* (2006.01)
(52) U.S. Cl. .............................. 707/1; 707/5
(58) Field of Classification Search .................... 707/1, 707/5
  See application file for complete search history.

(56) References Cited

U.S. PATENT DOCUMENTS 6,104,500 A * 8/2000 Alam et al. ................. 358/1.15
6,108,103 A * 8/2000 Kurozasa .................... 358/405
6,359,974 B1 * 3/2002 Ishibashi ............... 379/100.06
6,906,817 B1 * 6/2005 Berard et al. .............. 358/1.15
6,980,331 B1 * 12/2005 Mooney et al. ............. 358/400
2003/0133550 A1 * 7/2003 Mazor et al. .......... 379/100.06
2004/0075871 A1 * 4/2004 Itoh .......................... 358/440
2004/0107259 A1 * 6/2004 Wallace et al. ............. 709/206
2005/0076013 A1 * 4/2005 Hilbert et al. .................. 707/3

OTHER PUBLICATIONS

Likforman-Sulem et al., "Proper names extraction from fax images combining textual and image features", International Conference on Document Analysis and Recognition, pp. 545-549, 2003.
Freund et al., "A decision-theoretic generalization of on-line learning and an application to boosting", Journal of Computer and System Sciences 55, pp. 119-139, 1997.
Tieu, et al., "Boosting image retrieval", International Conference on Computer Vision, 2000.
Viola et al., "Rapid Object Detection Using a Boosted Cascade of Simple Features" Proceedings of the IEEE Conference on Computer Vision and Pattern Recognition, 2001.

* cited by examiner

*Primary Examiner*—Apu Mofiz
*Assistant Examiner*—Cindy Nguyen
(74) *Attorney, Agent, or Firm*—Todd R. Fronek; Westman, Champlin & Kelly P.A.

(57) ABSTRACT

The present invention relates to a method of automatically processing an electronic document for routing over a computer network. The method includes recognizing text in the document to identify a candidate address, accessing a collection of potential destinations and comparing the candidate address to the collection of potential destinations to determine a destination for the document.

19 Claims, 10 Drawing Sheets

```
                200
                  ↘

┌─────────────────────────┐
        │   IDENTIFY CLASSIFYING  │
        │  KEYWORDS FROM TRAINING │───── 201
        │  DOCUMENTS INDICATIVE OF│
        │ INFORMATIONAL PROPERTIES│
        └───────────┬─────────────┘
                    ▼
        ┌─────────────────────────┐
        │IDENTIFY POTENTIAL FEATURES│
        │OF THE CLASSIFYING KEYWORDS│
        │BASED ON TEXT, RELATION TO │──── 202
        │ OTHER WORDS AND DOCUMENT  │
        │          LAYOUT           │
        └───────────┬─────────────┘
                    ▼
        ┌─────────────────────────┐
        │   SELECT BEST FEATURES  │
        │      INDICATIVE OF THE  │───── 203
        │ INFORMATIONAL PROPERTIES│
        └───────────┬─────────────┘
                    ▼
        ┌─────────────────────────┐
        │  DEVELOP A CLASSIFIER TO│
        │ EXPRESS BEST FEATURES FOR│──── 204
        │ EXTRACTION OF INFORMATION│
        └─────────────────────────┘
```

FIG. 2

PROCESSING AN ELECTRONIC DOCUMENT FOR INFORMATION EXTRACTION

CROSS REFERENCE TO RELATED APPLICATION

The present application is a continuation of and claims priority of U.S. patent application Ser. No. 10/835,215, filed Apr. 29, 2004, which is also based on and claims the benefit of U.S. provisional patent application Ser. No. 60/527,219, filed Dec. 4, 2004, the contents of each of the foregoing applications are hereby incorporated by reference in their entirety.

BACKGROUND OF THE INVENTION

The present invention relates to processing electronic documents. In particular, the present invention relates to processing electronic documents to extract information from the document.

A large amount of electronic documents are prevalent today throughout organizations and on the internet. These documents contain useful informational elements for a number of different purposes. For example, a purchase order will contain product and price information. Likewise, a fax will include a sender, a recipient and a subject. Additionally, documents can be classified according to various document types such as letters, resumes, memos, reports, recipes, fliers, magazines, etc. Informational elements associated with a document such as classification, recipient, subject and/or product number can be identified and/or extracted by manual examination of the document. While manual examination is effective for a small number of documents, examination can become time consuming and costly for extracting informational elements associated with a large number of documents.

One particular application for identifying informational elements in a document is identifying a recipient in a fax document. Fax machines are found throughout businesses today for transmitting and receiving documents. Businesses typically have a single fax number for a plurality of employees. To send a fax document, a transmitting fax machine scans the document to form an image and transmits the image to a receiving fax machine. The receiving fax machine prints out the document, where it can then be routed to the correct recipients by a simple manual examination of contents of the fax.

Alternatively, a growing number of incoming faxes arrive at computers equipped with fax modems or through an internet fax service. When a fax document is sent to a computer as an electronic document, the fax can be routed to the correct person over a computer network, for example by attaching the fax to an e-mail message addressed to the recipient. To route the fax document, a user examines each fax document to identify the correct recipient and then routes the document to the recipient via e-mail.

In companies that receive thousands of faxes per day, the expense and time for routing a fax to the correct recipient can be extremely high if manual examination and routing of each fax document is required. Thus, an automatic system for processing fax documents to identify the correct recipient and route the fax document based on the identified recipient would address problems associated with manually examining and routing fax documents. Additionally, automatically extracting information from and associating electronic documents and/or portions thereof with informational elements will aid in classification of documents, identifying informational fields and searching documents, for example.

SUMMARY OF THE INVENTION

The present invention relates to a method of automatically processing an electronic document for routing over a computer network. The method includes recognizing text in the document to identify a candidate address, accessing a collection of potential destinations and comparing the candidate address to the collection of potential destinations to determine a destination for the document.

Another aspect of the present invention relates to a computer readable medium having instructions that, when implemented on a computer, cause the computer to process a document for routing to a selected address. The instructions include a recognition module adapted to recognize text within the document and an identification module adapted to identify features of the text within the document. A comparison module is adapted to compare the text to a collection of addresses and determine a recipient based on the text and the features.

BRIEF DESCRIPTION OF THE DRAWINGS

FIG. 2 is a flow chart of an exemplary method for selecting features for information extraction.

DETAILED DESCRIPTION OF ILLUSTRATIVE EMBODIMENTS

The present invention relates generally to automatically processing electronic documents. In one aspect, features and/or properties of words are identified from a set of training documents to aid in extracting information from documents to be processed. The features and/or properties relate to text of the words, position of the words and the relationship to other words. A classifier is developed to express these features and/or properties. During information extraction, documents are processed and analyzed based on the classifier and information is extracted based on correspondence of the documents and the features/properties expressed by the classifier.

Figure 1:
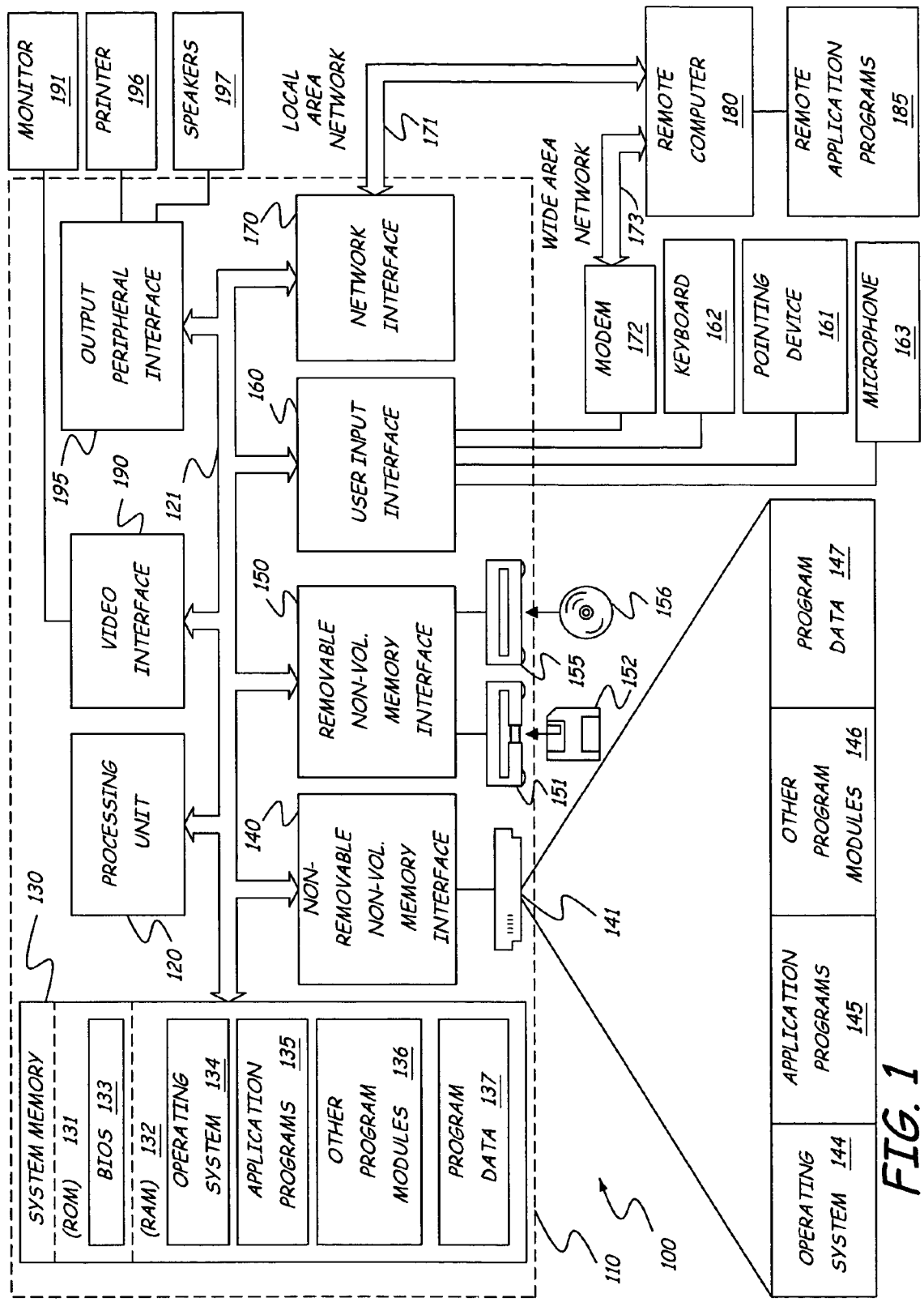
FIG. 1 is a block diagram of a computing environment that can be used to implement the present invention.
Figure 3:
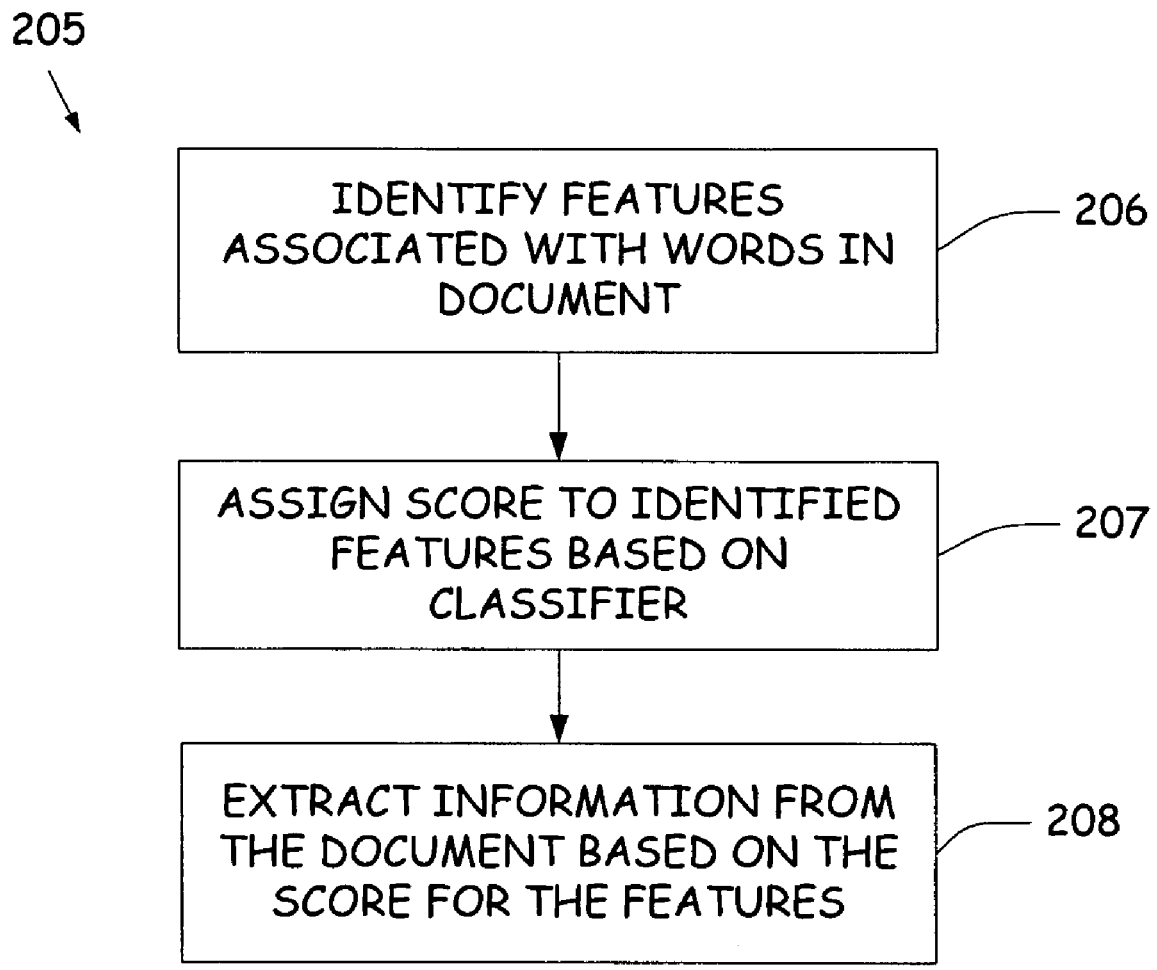
FIG. 3 is a flow chart of an exemplary method for extracting information from a document.

FIG. 1 illustrates a general operating environment utilized to implement the invention. FIGS. 2-3 generally illustrate methods for selecting features used in developing a classifier and extracting information from documents. These methods can be applied to various different applications such as the specific examples to fax routing discussed with respect to FIGS. 4-8 and document classification discussed with respect to FIGS. 9-10.

I. General Operating Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. General Selection of Features and Information Extraction Based on Selected Features FIG. 2 is an exemplary method for selecting features of documents to develop a classifier used to extract information from documents and/or portions thereof. Typically, the selection of features is performed on a set of training documents. The features can be based on classifying keywords and information about the classifying keywords such as the text of the keyword, the relation to other words and the document layout. For example, in one embodiment, training faxes can include a highlighted portion identifying a recipient.

Training documents can also include documents having instances of informational elements to be extracted (referred to as "positive examples") and documents lacking instances of informational elements to be extracted (referred to as "negative examples"). For example, a resume could be a positive example of a resume document and a non-resume could be a negative example of a resume document.

Method 200 begins at step 201 wherein classifying keywords are identified from training documents. These keywords are related to an informational element or property of the document and can be chosen manually or automatically. For example, a resume can include keywords such as "resume", "experience" and/or "activities". Likewise for a fax, keywords can be associated with a recipient name, a sender name and/or a subject or keywords such as "to" or "attention". In order to automatically select classifying keywords, the potential classifying keywords can be identified as words that are reliably distinct or discriminative of a particular informational property of a document. Discriminative words are more frequent than average for the property or alternatively less frequent than average for the property. By analyzing a plurality of documents either with or without the informational property, a set of keywords that occur more or less frequently can be identified.

Once the classifying keywords are identified, potential features of the keywords based on text, relation to other words and document layout are identified at step 202. Instances of the classifying keywords within the labeled training documents are used as examples. In one embodiment, the features are expressed as binary functions, i.e. a feature in the document is either true or not true. For example, the classifying keyword "resume" can include a text feature that returns true if a document word matches to the string "resume", a location feature that returns true if the word "resume" is near the top of the page and/or a relationship feature that returns true if the word "resume" is on a line with few other words. Likewise for a fax document, a recipient name feature in a fax can return true if the name is within a selected distance of the words "to" or "attention".

Features can be computed from relation to graphic lines in the document. For instance, the total in a bill often appear under a horizontal line, so a feature could be a function of keyword and the nearest horizontal line. Similarly, tables have a meaningful impact on the semantic of a word, and features involving horizontal and vertical lines are advantageous. Features can also be based on other graphical artifacts such as fonts, bold, underline, circling, arrows, and margin notes. Arbitrarily complex features can be computed, such as whether a date is valid, whether a total corresponds to the sum of the elements above, and whether a label matches the object or text it describes.

Once the potential features are identified, the best features are selected at step 203, for example, by scoring the potential features and choosing the features with the highest score. If desired, a classifier can be developed to express the best features at step 204. The classifier, which can be a weighted combination of features, is used when assigning a relevance score to words in a document. The relevance score can be used to further process words in the document to identify particular fields associated with the document. In another example, the classifier expresses a structural keyword that defines the text of the word as well as various properties associated with the word that can be used to classify the document as being of a particular type.

FIG. 3 illustrates an exemplary method 205 for extracting information from documents and/or portions thereof. At step 206, features associated with words within a document to be processed are identified. For example, the words "resume", "purchase" or "memo" and associated location, text and relationship features can be identified. Additionally, the words and associated features can be a name and/or a word closely associated with specific information such as "to", "purchase order", etc. Other features can relate to distance from a word to the Nth nearest word, the number of words on a current line, distance from a word to the top of the page, distance from a word to a classifying word, etc. At step 207, a score is assigned to the identified words based on the classifier developed by method 200 described above. In one embodiment, each word in a document can be assigned a score based on the classifier. Information is then extracted from the document based on the assigned score at step 208. The examples provided below discuss approaches for developing classifiers from training documents and extracting information using a score indicative of correspondence between the developed classifier and a document to be processed.

III. Illustrative Embodiment for Routing a Fax to a Recipient

FIGS. 4-8 illustrate an illustrative embodiment for extracting information from a document to associate an extracted portion with a recipient of the document. In the example provided below, features for developing a classifier are identified to aid in extracting a recipient from fax documents. During extraction, candidate recipients of a fax are identified and compared to a database to identify a destination for the fax. Those skilled in the art will appreciate that this embodiment is merely illustrative and the general techniques described herein can be applied to other document processing situations.

Figure 4:
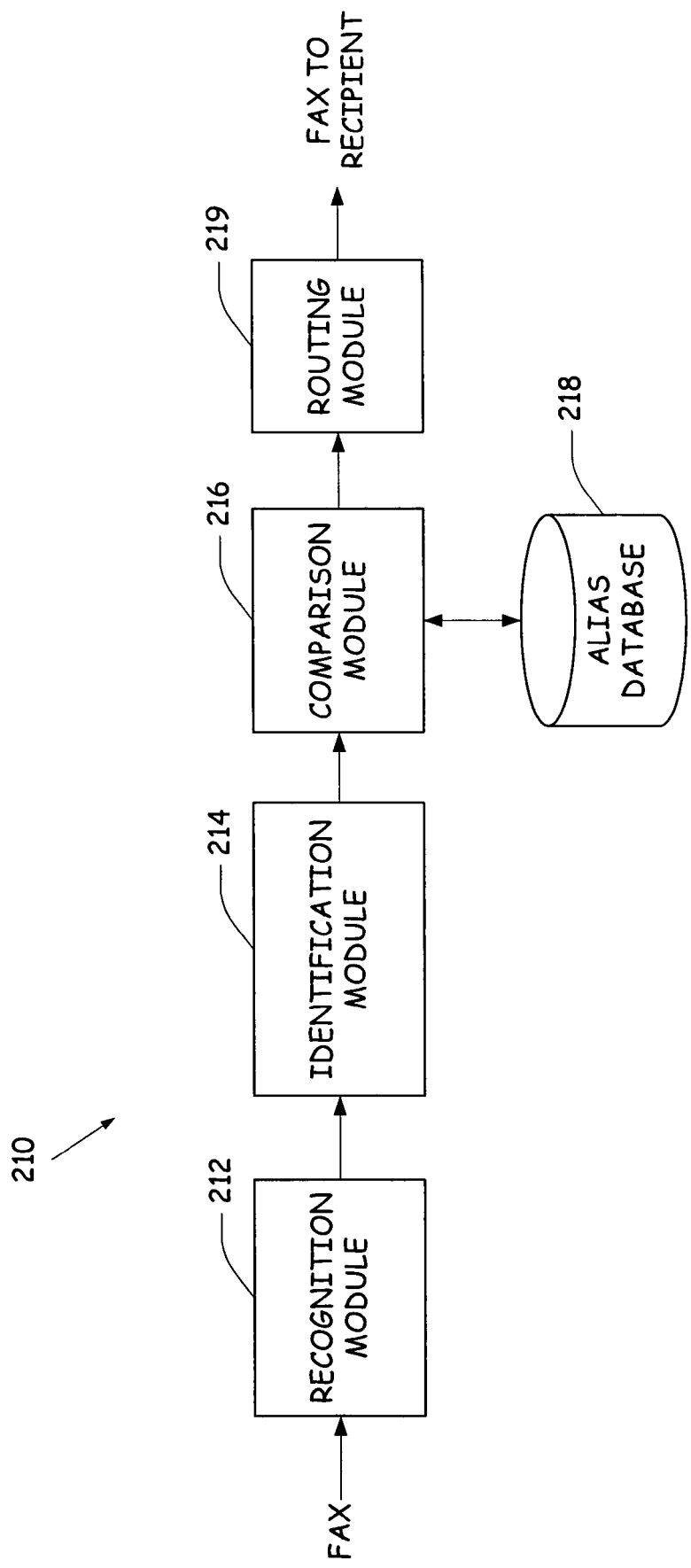
FIG. 4 is a block diagram of a document processing system in accordance with an embodiment of the present invention.

FIG. 4 is a block diagram of an exemplary system 210 for processing a fax to route to a recipient. A fax is sent to recognition module 212, where text in the fax is recognized. In one embodiment, recognition module 212 performs optical character recognition on the fax image to identify text contained therein. The identified text is sent to identification module 214, which is adapted to examine the text in the fax and identify candidate words that are likely to be relevant to a recipient's name. In one embodiment, scores are assigned by identification module 214 to each word based on selected features. The selected features can be based on a word's text, location and proximity to other words, for example.

Comparison module 216 compares the relevant candidate words to alias database 218. A number of different searching algorithms can be used by comparison module 216 to compare the candidate relevant words to entries in the alias database 218. Alias database 218 includes a plurality of entries that are possible destinations (i.e. a plurality of e-mail addresses) for the fax. For example, alias database 218 can include information associated with employees from a particular company (i.e. first name, last name, e-mail address, etc.). If comparison module 216 identifies a match between the relevant candidate words and an entry in the alias database 218, the identified recipient's address can be sent to routing module 219. Routing module 219 can then route the fax to the identified recipient, for example in an e-mail message over a computer network.

Figure 5:
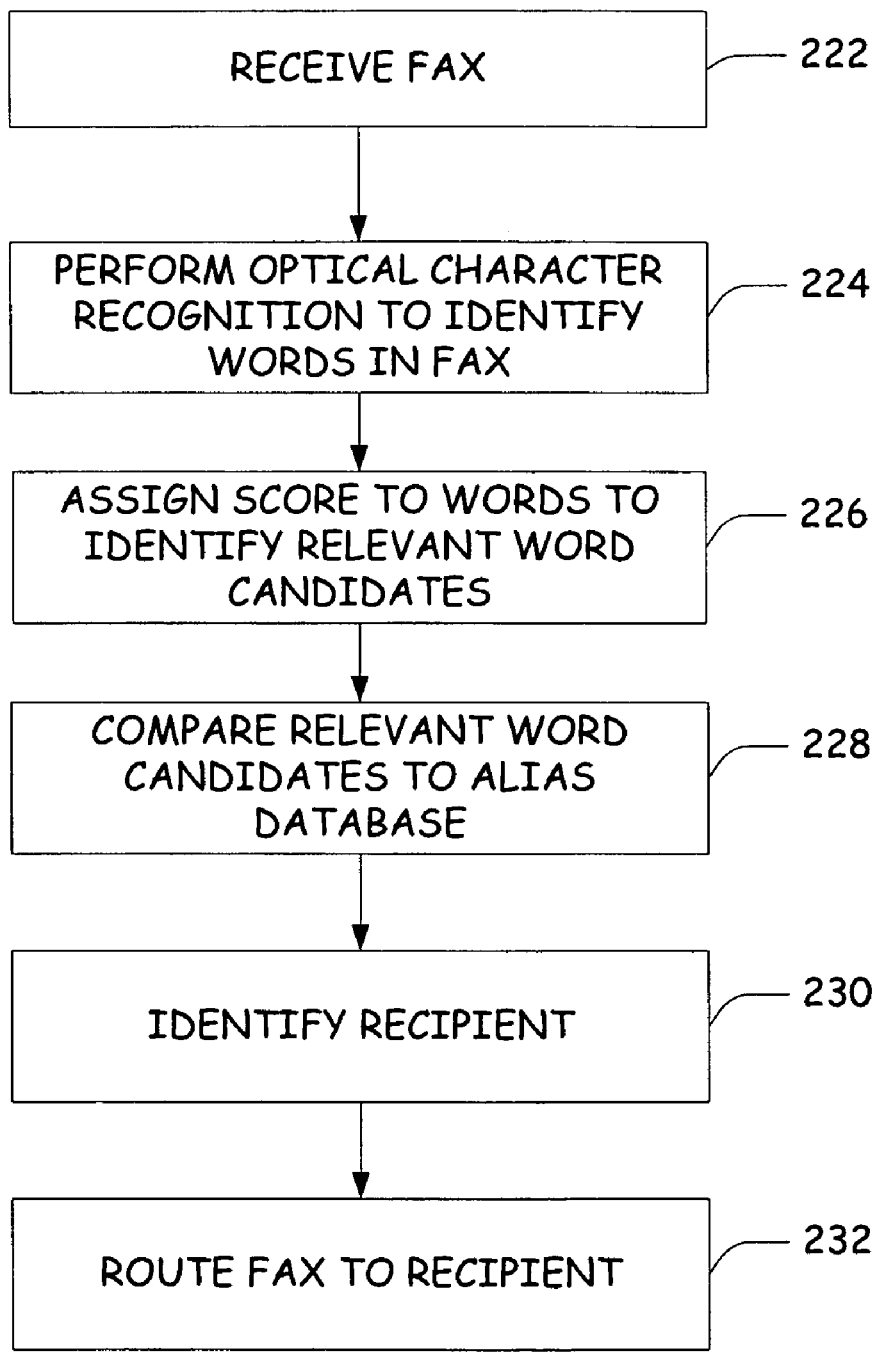
FIG. 5 is a flow chart of a method of processing a document for automatically routing a fax to a recipient.

FIG. 5 is a flow chart for a method 220 of routing a fax to a recipient that can be implemented in system 210 of FIG. 4. At step 222, the fax is received, for example, by a computer equipped with a fax modem. At step 224, optical character recognition is performed on the fax to identify words contained in the fax. Recognition can be performed on printed characters and can also be extended to recognize hand-written characters. Scores are assigned to each of the recognized words in the fax to identify relevant word candidates at step 226. In one embodiment, the assigned score is expressed as a sum of binary word functions associated with each word based on various features of the word. These features can define binary word functions related to the text of the word, the location of the word and the spatial relationship of the word to other words, for example. The features can be expressed using the following form:

$$f_j(w_i) \in \begin{cases} \alpha_j & \text{if the feature is true} \\ \beta_j & \text{otherwise} \end{cases}$$

where $w_i$ is a word on the page and the parameters alpha and beta are real valued numbers potentially represented as floating point numbers.

Exemplary binary word functions include:
Is the word equal to the string "Mr."?
Does the word include the substring ".com"?
Is the word more than seven inches from the top of the page?
Is the word within 0.5 inches of the word "attention"?
Is the distance to the nearest word greater than one inch?

Alternative embodiments for the features include neural networks and other types of learning algorithms. Using a number of these and other functions associated with features, a score for each word can be expressed as $$\sum_j f_j(w).$$

Due to the fact that faxes are prepared in different ways, there are a large number of potential features that can be used to identify recipient information. In one embodiment, a large number of features can be generated from training data. Training data can include a collection of faxes with highlighted recipient information as well as a training database of potential recipients. Example features include word text features related to commonly occurring words in the training faxes, the words in the training database and common substrings from the training database (e.g. ".com"). Location filters can be used that correspond to an X location, Y location and/or other locations relative to the fax page. Additionally, relationship features related to a word being within a certain distance compared to a common word identified, the distance to the nth nearest word and the number of words on the current line can be used.

In order to create a more efficient feature identification process, the number of features used can be limited using a process that identifies effective features. Once such process is known as the AdaBoost algorithm, which can select more effective features as well as assign scores $\alpha_j$ and $\beta_j$ to each of the feature functions. The AdaBoost algorithm proceeds in rounds, wherein a "best" new feature is added to a classifier. Using these features and scores, a relevant word classifier can be generated that will assign scores to each word in a fax or portion of a fax such as a cover page. Words with the highest scores are identified as relevant word candidates.

As step 228, relevant word candidates are compared to entries in the alias database 218. A number of different comparing algorithms can be used for comparing relative word candidates to entries in the alias database 218. Given the comparison, a recipient can be identified at step 230. In one embodiment, the recipient is identified based on the relevant word candidate with the highest matching score when compared to the alias database 218. After the recipient has been identified, the fax is routed to the recipient at step 232, for example via an e-mail.

Figure 6:
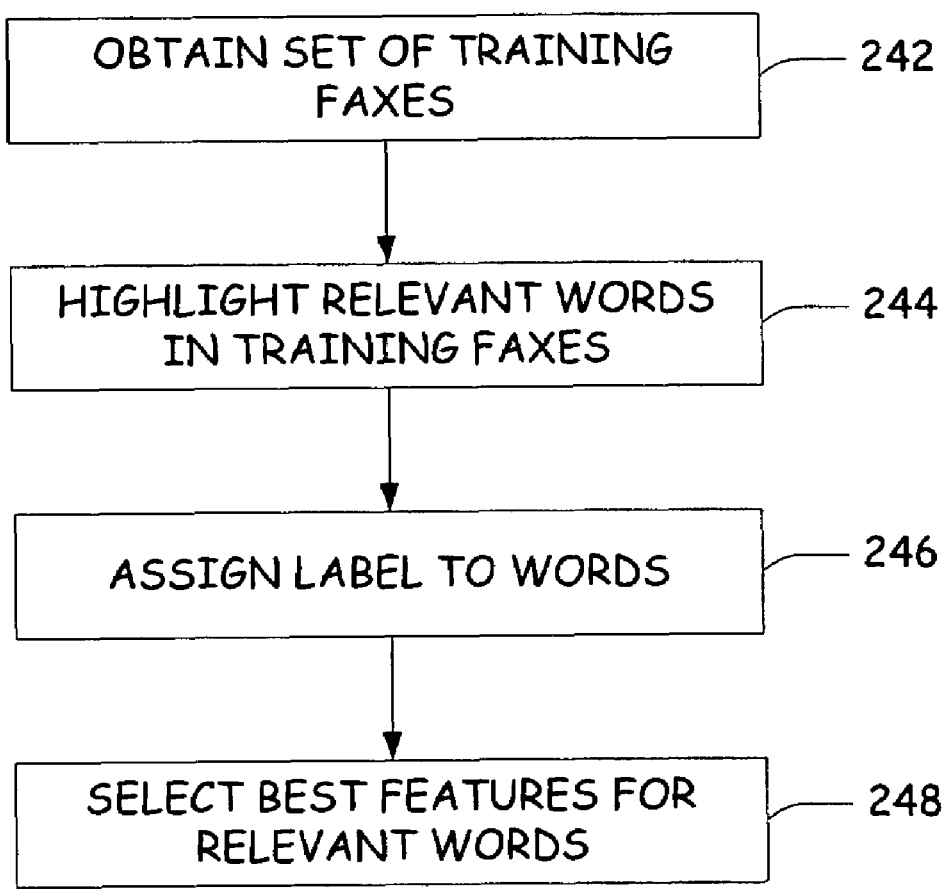
FIG. 6 is a flow chart of a method for selecting features to be used when processing a fax.

Since faxes take on various forms and structures, a large number of word/text features can be identified that pertain to relevant recipient information. In order to select more effective and efficient features at identifying recipients, a training algorithm can be employed for developing a word/text classifier that is used as part of the relevant word classifier discussed above. FIG. 6 is a flow chart of a method 240 for developing an efficient word/text classifier. Method 240 begins at step 242, where a set of training faxes is obtained. In each of the training faxes, relevant words pertaining to the recipient are highlighted. Labels for the relevant words are assigned at step 246. For example, a word deemed relevant can be assigned a label of +1 while a word deemed to be not relevant can be assigned a label of −1 (for each word $w_i$ a label $y_i \ni \{+1,-1\}$ is assigned). Using these labels, the best word/text features for the word/text classifier can be selected at step 248, for example by using a boosting algorithm.

There are many potential algorithms for selecting the best features, one exemplary algorithm is to select those features which most accurately label the set of relevant and irrelevant words. The set of all potential features $f_j(w)$ can be enumerated and those which maximize the function $$\sum_i y_i f_j(w_i)$$

are selected. It should be noted that any similar criteria which measure the agreement between feature and label can be used.

Another exemplary algorithm for feature selection is AdaBoost in which a weight $d_i$ is assigned to each word. Feature selection proceeds in rounds, in each round the feature which maximizes the function $$\sum_i d_i y_i f_j(w_i)$$

is selected. The weights are then updated so that $$d_i^{NEW} = d_i^{PREVIOUS} \exp(-y_i f(w_i))$$

where f(w) is the feature selected in this round. Before the first round the weights are initialized to the value 1. After the feature selection and learning process, labeled relevant words are assigned a higher word/text classifier score such that when the words occur in an incoming fax, the words are assigned a higher relevance score during processing.

Figure 7:
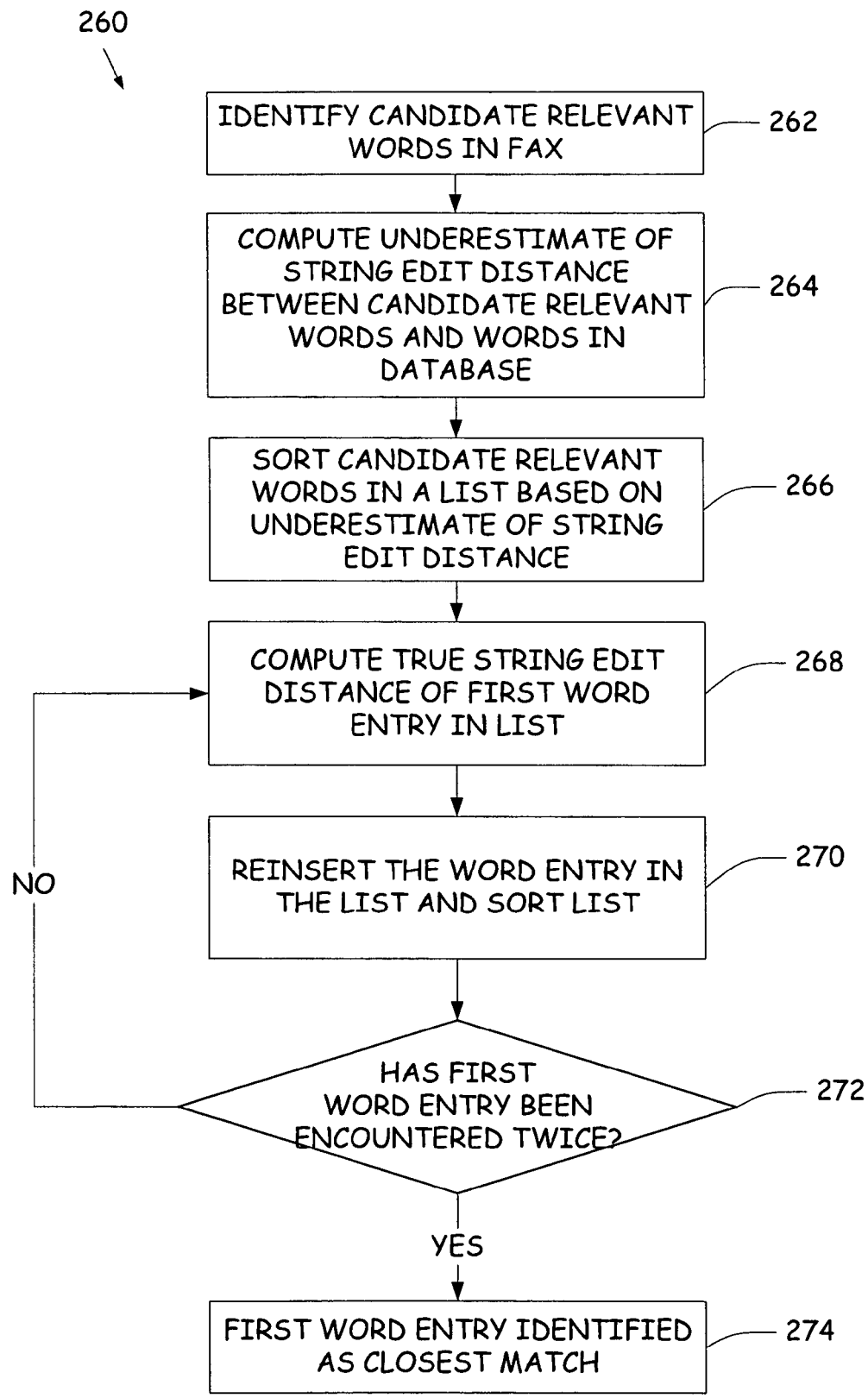
FIG. 7 is a flow chart of an exemplary method for searching a database of potential recipients.

FIG. 7 is an exemplary method for selecting candidate recipients from a collection of potential recipients of a fax. Method 260 begins at step 262, wherein candidate relevant words are identified in the fax. As discussed above, this identification can be performed using a relevant word score and selecting the highest scoring words. At step 264, an underestimate of a string edit distance for the candidate relevant words is computed. The string edit distance is a representation of the difference between a candidate relevant word and word entries in an alias database. The string edit distance between two strings measures the number of characters that must be added to the first string, deleted from the second string or substituted in order for the two strings to match. Separate and independent costs can be assigned to deletion, addition and substitution errors.

To improve efficiency of searching the alias database, an underestimate of the string edit distance can first be computed. There are many possibilities for computing an underestimate for string edit distance. In one example, the underestimate of the string edit distance ignores a component of the string edit distance that assigns a score based on character order. As an example, the text "caate" includes two occurrences of 'a', one occurrence of 'c', one occurrence of 'e' and one occurrence of 't'. Additionally, the word "car" has one 'a', one 'c' and one 'r'. An underestimate of the string edit distance would be related to deleting one 'a' and one 'e', and substituting an 'r' for a 't'. The underestimate would ignore what order the characters occur to quickly and efficiently identify relevant database entries. Thus, in this example, "car" and "rac" would have the same string edit distance underestimate.

Once the string edit distance underestimate has been computed for each word, the candidate relevant words are sorted in a list based on the underestimate at step 266. At step 268, the true string edit distance of the first word entry in the list is computed. The true string edit distance is computed based on the order of characters. At step 270, the word entry is reinserted into the list using the true string edit distance as its score and the list is sorted again. The method 260 then proceeds to step 272, where it is determined if the first word entry in the list has been encountered twice. If the first word entry has indeed been encountered twice, then the word entry is selected as the closest match to the word entry in the database at step 274. If the word entry has not been encountered twice, the method 260 returns to step 268, where the true string edit distance of the first word entry in the list is computed. Method 260 can be performed on each of the relevant words identified in the fax. Given the closest matches, a recipient can be selected based on a contiguous word score as discussed below.

Figure 8:
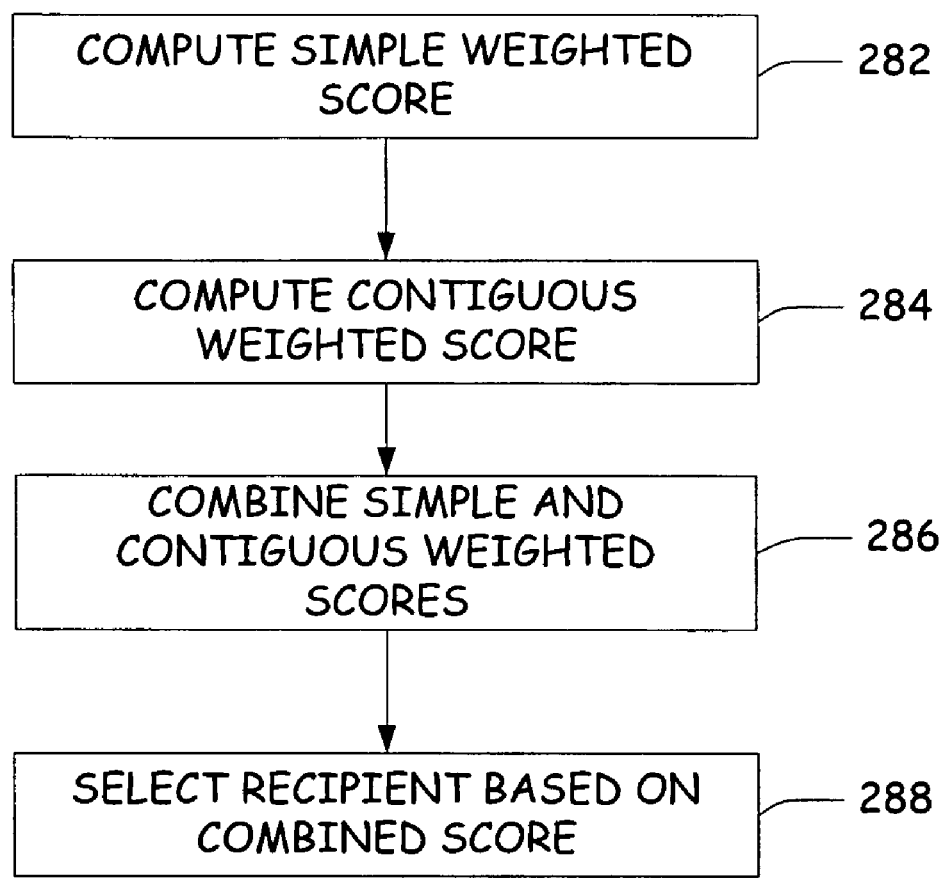
FIG. 8 is a flow chart of a method of selecting a recipient based on a score associated with contiguous words in a fax.

FIG. 8 is a flow chart of a method of selecting a recipient based on a score associated with contiguous words occurring in a fax. Method 280 begins at step 282 where a simple weighted score for each alias in the alias database is computed. The simple weighted score can be based on the relevance score and the best match. For example, the following formula can represent the simple weighted score:

$$s(a) = \sum_w r(w) m(a, w)$$

where a is an alias, w is a word, s(a) is the score for the alias, the summation is applied over words in the document, r(w) is the relevance score of the word and m(a, w) is the best match between the word and an entry in the alias record (i.e. first name, last name, full name, e-mail address).

At step 284, a contiguous weighted score is computed for contiguous words in the fax. Since recipient names in a fax typically include both the first name and the last name of a recipient, the contiguous weighted score aids in identifying a correct recipient. A contiguous weighted score for an alias can be computed for contiguous words that match or closely match multiple entries in an alias. At step 286, the simple and contiguous weighted scores are combined.

For two contiguous words $w_t$ and $w_{t+1}$, the combined score for an alias can be modeled as follows, where C is a function that combines relevance scores:

$$s(a) = \sum_{w_t, w_{t+1}} C(r(w_t), r(w_{t+1}))m(a, w_t, w_{t+1}) + \sum_{w} r(w)m(a, w)$$

where $$m(a, w_t, w_{t+1}) = \min \begin{cases} m(\text{``first last''}, \text{``}w_t w_{t+1}\text{''}) \\ m(\text{``last first''}, \text{``}w_t w_{t+1}\text{''}) \\ m(\text{full\_name}, \text{``}w_t w_{t+1}\text{''}) \\ m(\text{first}, \text{``}w_t w_{t+1}\text{''}) \\ m(\text{last}, \text{``}w_t w_{t+1}\text{''}) \end{cases}$$

First, last and full-name are all entries in an associated alias record. At step 288, an alias in the database is selected as the recipient based on the combination score.

IV. Illustrative Embodiment for Classifying a Document

Figure 9:
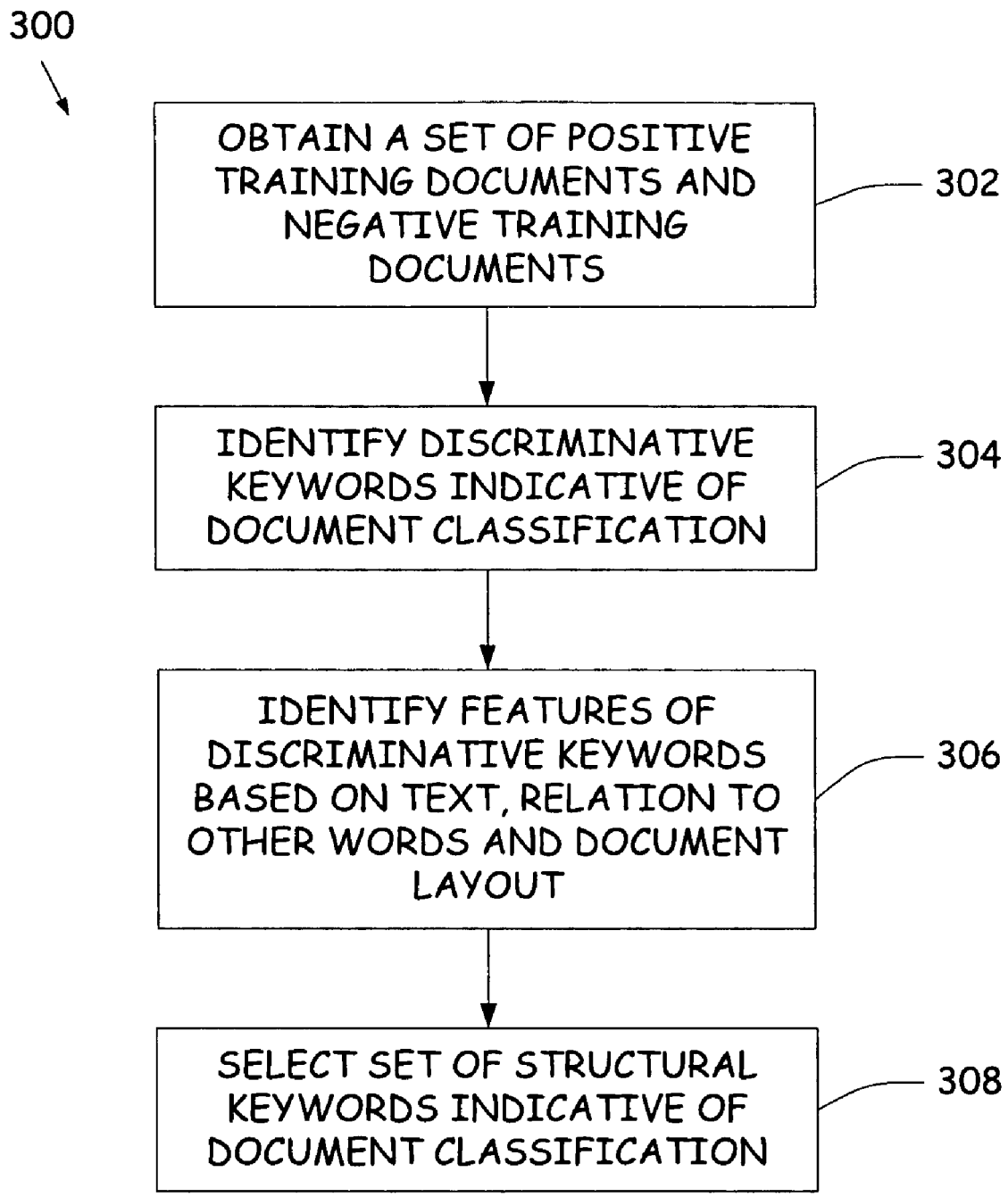
FIG. 9 is a flow chart of an exemplary method of selecting keywords for classifying documents.
Figure 10:
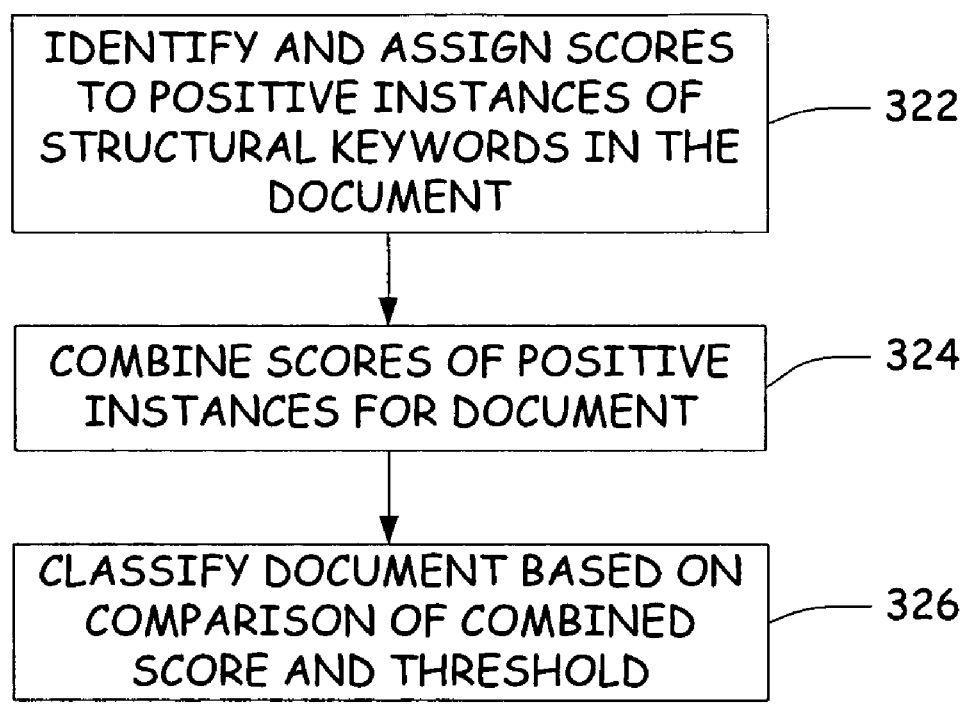
FIG. 10 is a flow chart of an exemplary method of classifying a document based on structural keyword identification.

FIGS. 9-10 are flow charts of an illustrative embodiment for identifying features and extracting information to classify a document as being of a particular type. For example, the document can be identified as a resume, purchase order, letter, memo, recipe, flier, magazine, research paper, etc. In the embodiment provide below, structural keywords are identified based on a set of training documents. During extraction, positive instances of structural keywords are identified and assigned a score in order to classify documents. Those skilled in the art will appreciate that this embodiment is merely illustrative and can be applied to other document processing situations.

FIG. 9 is a flow chart of an exemplary method of selecting structural keywords for use in classifying documents. Method 300 includes step 302 wherein a set of positive training documents and negative training documents are obtained. The positive training documents are classified as a particular type while the negative training documents are classified as not being of the particular type. As an example, using a set of resume documents and a set of non-resume documents, positive and negative examples can identify potential features. For example, each instance of the word "resume" in a resume document is considered a positive example while each instance of the word "resume" in a non-resume document is considered a negative example. The features and the associated classifier developed are used to express properties of these words.

At step 304, discriminative keywords are identified that are indicative of the document classification. As mentioned above, the discriminative keywords occur more frequently or less frequently for a particular classification of documents. For example, a recipe document will likely contain ingredients such as "salt" and "pepper". Likewise, a resume document is more likely to include the words "resume", "experience" and/or "activities".

At step 306, features are identified that express properties of the discriminative keywords, for example based on the text of the keyword, relation of the keyword to other words and the document layout. Instances of discriminative keywords in a positive document are considered positive examples and instances in a negative document are considered negative examples.

At step 308, a set of structural keywords indicative of document classification that express the discriminative keywords and properties thereof are selected based on the properties associated with the identified features. As mentioned above, a boosting algorithm can be used in order to select a set of best features for the document classification.

A set of words can be combined to form the structural keywords as well. In this case, each word in a document is expressed as a vector of word features (recall that each feature is binary, so the outcome of all word features can be viewed as a binary vector). The words from each training document are considered a set. For identification of features of structural keywords, at least one word from the positive set must be classified positive, while no words from a negative document must be classified positive.

Given the set of binary vectors (one for each word) a classification function can be developed for the structural keywords of the form:

$$s(w) = \sum_i \lambda_i b_i(w)$$

where w is the word in a document, $b_i(w)$ is the value of the ith binary word feature, and $\lambda_i$ is the weight on the word. The classification function is developed so that no word from a negative document is assigned a positive score, while at least one word from each positive document is assigned a positive score. The set of weights defines the structural keyword set, since it depends on the word features which include both text word features and structural word features. Documents are then classified by scoring each word in the document and classifying the document negative if no word is assigned a positive score, and positive otherwise.

In situations where no set of valid feature weights are possible (a set of feature weights that yield zero error), a collection of structural keywords can be learned by selecting the best features. For example, a boosting process such as the AdaBoost process can select the best features through a number of evaluation rounds. On the first round, a set of lambdas (weights) is selected that minimizes the number of misclassified documents. On subsequent rounds, documents are assigned a document weight based on the AdaBoost learning criteria. In each subsequent round, the weighted error on the documents is minimized by selecting a new structural keyword (i.e. a new set of feature weights).

FIG. 10 is a flowchart of an exemplary method 320 for classifying a document. Method 320 begins at step 322 wherein positive instances of structural keywords are identified and assigned scores from the document. For example, positive instances of the structural keywords can be counted and/or the positive instances can be weighted depending on the best features for a particular document classification. Additionally, documents can be classified using a voting scheme where if a structured keyword is found, the associated class of document gets a vote.

At step 324, the scores of positive instances for the document are combined. In one embodiment, the scores are simply added in order to assign a combined score for the entire document. At step 326, the document is classified based on a comparison of the combined score with a selected threshold. The selected threshold can be determined in a number of different ways.

The present invention described herein provides an approach to automatically process electronic documents and extract information from the documents and/or portions thereof. For example, text in a fax document can be recognized and a destination can be selected based on the text and a collection of possible destinations. It is worth noting that the approach can also be extended to other situations. Text in the fax can be recognized to identify other fields such as a sender's name, a subject field or other specified information. Additionally, documents can be classified based on various features and text contained therein as described above.

Although the present invention has been described with reference to particular embodiments, workers skilled in the art will recognize that changes may be made in form and detail without departing from the spirit and scope of the invention.

What is claimed is:

1. A method of automatically processing an electronic document for routing over a computer network, comprising:
   recognizing text in the document to identify a candidate address indicative of a portion of the document containing a potential destination;
   accessing a collection of potential destinations;
   computing a first weighted score and a contiguous weighted score for at least one potential destination, wherein the first weighted score is indicative of a difference between a word in the candidate address and a word associated with the at least one potential destination, and wherein the contiguous weighted score is indicative of a difference between contiguous words in the candidate address and words associated with the at least one potential destination;
   computing a combined score for the at least one potential destination based on the first weighted score and the contiguous weighted score;
   determining a recipient from the collection of potential destinations based on the combined score; and
   routing the document to the recipient.

2. The method of claim 1 and further comprising: identifying features associated with the candidate addresses.

3. The method of claim 2 and further comprising: assigning a score to the candidate address based on the features of the candidate address.

4. The method of claim 2 wherein the features relate to at least one of a location of the candidate address, a distance from the candidate address to a selected word and text of the candidate address.

5. The method of claim 1 and further comprising: computing a value indicative of a difference between the candidate address and at least one potential destination.

6. The method of claim 5 wherein the value is computed based on the difference between a word in the candidate address and a word associated with the at least one potential destination.

7. The method of claim 1 wherein the collection of potential destinations is stored in a database with associated fields including at least a first name, a last name and an email address of a recipient.

8. The method of claim 1 wherein the document is a fax.

9. A computer storage medium having instructions that, when implemented on a computer, cause the computer to process a document for routing to a selected address, the instructions comprising:
   a recognition module adapted to recognize words within the document, the recognized words being indicative of a portion of the document containing containing a potential destination;
   an identification module adapted to identify features of the recognized words within the document and assign a relevance score to each recognized word based on the features, wherein the features relate to at least one of a location of a word in the text, a distance from a word in the text to a nearby word in the text and text of a word, and wherein the identification module is further adapted to select relevant word candidates from the recognized words based on the relevance score;
   a comparison module adapted to compare the relevant word candidates to words associated with a collection of addresses and determine a recipient based on the text and the features; and
   a routing module adapted to route the document to the recipient.

10. The computer storage medium of claim 9 wherein the recognition module is adapted to perform optical character recognition.

11. The computer storage medium of claim 9 wherein the words associated with the collection of addresses correspond to at least one of a first name, a last name and an email address.

12. The computer storage medium of claim 9 wherein the features relate to at least one of a location of a word in the text, a distance from a word in the text to a nearby word in the text and text of a word.

13. A method of processing an electronic document for routing over a computer network, comprising:
   recognizing text in the document to identify a plurality of candidate addresses, wherein each of the plurality of candidate addresses is indicative of a portion of the document containing a potential destination;
   accessing a collection of potential destinations;
   identifying features associated with the plurality of candidate addresses;
   computing weighted relevance scores for the plurality of candidate addresses, wherein the scores are weighted based on the identified features;
   generating a list of the candidate addresses;
   sorting the list of candidate addresses based on the weighted relevance scores;
   determining a recipient from the collection of potential destinations based on the list; and
   routing the document to the recipient.

14. The method of claim 13 wherein identifying features further comprises identifying features relating to at least one of a location of the candidate address, a distance from the candidate address to a selected word and text of the candidate address.

15. The method of claim 13 wherein identifying features further comprises identifying a substring indicative of one of an email address and an alias.

16. The method of claim 13 wherein the collection of potential destinations is stored in a database with associated fields including at least a first name, a last name and an email address of a recipient.

17. The method of claim 13 wherein the document is a fax.

18. The method of claim 13 and further comprising generating the list of candidate addresses based on differences between words in the plurality of candidate addresses and words in the collection of potential destinations.

19. The method of claim 13 wherein determining a recipient comprises identifying a difference between a word in a candidate address and a word in the collection of potential destinations.

* * * * *